US008949797B2

(12) United States Patent
Aaraj et al.

(10) Patent No.: US 8,949,797 B2
(45) Date of Patent: Feb. 3, 2015

(54) OPTIMIZING PERFORMANCE OF INTEGRITY MONITORING

(75) Inventors: Najwa Aaraj, Jdeidet-El-Metn (LB);
Mihai Christodorescu, Briarcliff Manor, NY (US); Dimitrios Pendarakis, Westport, CT (US); Reiner Sailer, Scarsdale, NY (US); Douglas L. Schales, Armonk, NY (US)

(73) Assignee: International Business Machines Corporation, Armonk, NY (US)

(*) Notice: Subject to any disclaimer, the term of this patent is extended or adjusted under 35 U.S.C. 154(b) by 1301 days.

(21) Appl. No.: 12/761,952

(22) Filed: Apr. 16, 2010

(65) Prior Publication Data

US 2011/0258610 A1 Oct. 20, 2011

(51) Int. Cl.
G06F 9/44 (2006.01)
G06F 9/45 (2006.01)
G06F 21/56 (2013.01)
G06F 21/55 (2013.01)

(52) U.S. Cl.
CPC ............ *G06F 21/566* (2013.01); *G06F 21/554* (2013.01); *G06F 21/563* (2013.01)
USPC ............ 717/127; 717/130; 717/131; 717/154

(58) Field of Classification Search
None
See application file for complete search history.

(56) References Cited

U.S. PATENT DOCUMENTS

| 4,827,478 A | | 5/1989 | Chan |
| 5,586,204 A | | 12/1996 | Noble et al. |
| 5,752,034 A | * | 5/1998 | Srivastava et al. ............ 717/130 |

(Continued)

FOREIGN PATENT DOCUMENTS

| WO | WO 2004/027551 A3 | 4/2004 |
| WO | WO 2009/024373 A3 | 2/2006 |

(Continued)

OTHER PUBLICATIONS

Kim et al., Experiences with Tripwire Using Integrity Checkers for Intrusion Detection, published Purdue e-Pubs, 1994, pp. 1-13.*

(Continued)

*Primary Examiner* — Xi D Chen
*Assistant Examiner* — Zheng Wei
(74) *Attorney, Agent, or Firm* — Scully, Scott, Murphy & Presser, P.C.; Preston J. Young, Esq.

(57) ABSTRACT

A system, method and computer program product for verifying integrity of a running application program on a computing device. The method comprises: determining entry points into an application programs processing space that impact proper execution impact program integrity; mapping data elements reachable from the determined entry points into a memory space of a host system where the application to verify is running; run-time monitoring, in the memory space, potential modification of the data elements in a manner potentially breaching program integrity; and initiating a response to the potential modification. The run-time monitoring detects when a data transaction, e.g., a write event, reaches a malicious agent's entry point, a corresponding memory hook is triggered and control is passed to a security agent running outside the monitored system. This agent requests the values of the data elements, and determines if invariants that have been previously computed hold true or not under the set of retrieved data values.

26 Claims, 9 Drawing Sheets

(56) References Cited

U.S. PATENT DOCUMENTS

| | | | |
|---|---|---|---|
| 6,463,581 B1* | 10/2002 | Bacon et al. | 717/154 |
| 6,625,648 B1* | 9/2003 | Schwaller et al. | 709/224 |
| 6,658,651 B2* | 12/2003 | O'Brien et al. | 717/127 |
| 6,763,380 B1* | 7/2004 | Mayton et al. | 709/224 |
| 6,785,815 B1 | 8/2004 | Serret-Avila et al. | |
| 7,076,767 B1* | 7/2006 | Williams | 717/127 |
| 7,430,670 B1 | 9/2008 | Horning et al. | |
| 7,490,323 B2* | 2/2009 | D'Alo et al. | 717/178 |
| 7,496,897 B1* | 2/2009 | Dibble et al. | 717/127 |
| 7,533,168 B1* | 5/2009 | Pabla et al. | 709/224 |
| 7,565,551 B2 | 7/2009 | Kirovski | |
| 7,571,227 B1* | 8/2009 | Pabla | 709/224 |
| 7,769,864 B2* | 8/2010 | Gebhart et al. | 709/226 |
| 7,917,897 B2* | 3/2011 | Bassin et al. | 717/131 |
| 8,041,798 B1* | 10/2011 | Pabla et al. | 709/223 |
| 8,141,063 B2* | 3/2012 | Foley | 717/154 |
| 8,387,017 B2* | 2/2013 | Calendino et al. | 717/124 |
| 8,387,022 B2* | 2/2013 | Horning et al. | 717/127 |
| 2002/0095660 A1* | 7/2002 | O'Brien et al. | 717/127 |
| 2003/0023956 A1* | 1/2003 | Dulberg et al. | 717/130 |
| 2003/0135791 A1 | 7/2003 | Natvig | |
| 2005/0132122 A1 | 6/2005 | Rozas | |
| 2005/0198275 A1* | 9/2005 | D'Alo et al. | 709/224 |
| 2006/0129996 A1* | 6/2006 | Armstrong et al. | 717/127 |
| 2006/0150256 A1 | 7/2006 | Fanton et al. | |
| 2006/0161898 A1* | 7/2006 | Bauman et al. | 717/127 |
| 2006/0218542 A1* | 9/2006 | Liu et al. | 717/154 |
| 2006/0230454 A1 | 10/2006 | Achanta et al. | |
| 2007/0214453 A1 | 9/2007 | Dive-Reclus | |
| 2007/0226697 A1* | 9/2007 | Barsness et al. | 717/127 |
| 2007/0240222 A1 | 10/2007 | Tuvell et al. | |
| 2007/0261120 A1 | 11/2007 | Arbaugh et al. | |
| 2007/0283441 A1 | 12/2007 | Cole et al. | |
| 2008/0201129 A1 | 8/2008 | Natvig | |
| 2008/0244533 A1* | 10/2008 | Berg et al. | 717/128 |
| 2008/0313460 A1 | 12/2008 | Lotspiech | |
| 2009/0037572 A1* | 2/2009 | Gebhart et al. | 709/224 |
| 2009/0055802 A1* | 2/2009 | Crosby | 717/125 |
| 2009/0064099 A1* | 3/2009 | Foley | 717/110 |
| 2009/0165135 A1 | 6/2009 | Lomont et al. | |
| 2009/0217247 A1* | 8/2009 | Kamigata et al. | 717/131 |
| 2009/0300587 A1* | 12/2009 | Zheng et al. | 717/127 |
| 2010/0037214 A1* | 2/2010 | Das et al. | 717/154 |
| 2010/0083236 A1* | 4/2010 | Porto et al. | 717/128 |
| 2010/0281273 A1* | 11/2010 | Lee et al. | 713/190 |
| 2011/0055813 A1* | 3/2011 | Calendino et al. | 717/124 |
| 2011/0202904 A1* | 8/2011 | Raz et al. | 717/130 |
| 2012/0151453 A1* | 6/2012 | Finking et al. | 717/130 |
| 2013/0212565 A1* | 8/2013 | Nishiyama | 717/131 |
| 2013/0227536 A1* | 8/2013 | Li et al. | 717/154 |
| 2014/0115565 A1* | 4/2014 | Abraham et al. | 717/128 |
| 2014/0130020 A1* | 5/2014 | Boshernitsan et al. | 717/131 |

FOREIGN PATENT DOCUMENTS

| | | |
|---|---|---|
| WO | WO 2006/038051 A1 | 4/2006 |
| WO | WO 2008/016146 A1 | 7/2008 |

OTHER PUBLICATIONS

O'Neil et al., Efficient Monitoring of Parametric Context-Free Patterns, published by IEEE, 2008, pp. 148-157.*

Chen et al., MOP: An Efficient and Generic Runtime Verificaiton Framework, published by ACM, 2007, pp. 569-588.*

Peng et al., Dynamic Trustiness Authentication Framwork BAsed on Software's Behavior Integrity, published !EEE, 2008, pp. 2283-2288.*

Jurjens et al., Security Analysis of Crypto-based Java Programs using Automated Teorem Provers, published by IEEE, 2006, pp. 1-10.*

Fei et al., "Microarchitectural Support for Program Code Integrity Monitoring in Application-specific Instruction Set Processors", JbiwkedgeGate from IBM Market Insights. Downloaded on Aug. 14, 2009 from IEEE Xplore, pp. 1-6.

Mai, J. et al., "Is Sampled Data Sufficient for Anomaly Detection?," in Proc. ACM SIGCOMM Conf. Internet Measurement, 2006, pp. 165-176.

Duffield, N. et al., "Properties and Prediction of Flow Statistics from Sampled Packet Streams," in Proc. ACM SIGCOMM Wkshp. Internet Measurement, 2002, pp. 159-171.

Petroni, N. et al., "Copilot—a coprocessor-based kernel runtime integrity monitor," in Proc. USENIX Security Symp., 2004, pp. 1-16.

Fei, Y., "Microarchitectural Support for Program Code Integrity Monitoring in Application-specific Instruction Set Processors," in Proc. Conf. Design, Automation & Test in Europe, 2007, pp. 1-6.

Milenkovic, M. et al., "Hardware support for code integrity in embedded processors," in Proc. Conf. Compilers, Architecture and Synthesis for Embedded Systems, 2005, pp. 55-65.

Lanzi, A., "K-Tracer: A System for Extracting Kernel Malware Behavior", In Proceedings of The 16th Annual Network and Distributed System Security Symposium (NDSS 2009), San Diego, CA, Feb. 2009, pp. 1-16.

Ernst, M. D., "Dynamically Discovering Likely Program Invariants", PhD thesis, University of Washington Department of Computer Science and Engineering, Seattle, Washington, Aug. 2000, pp. 1-128.

* cited by examiner

OPTIMIZING PERFORMANCE OF INTEGRITY MONITORING

The present invention relates to computing systems and performing integrity measurements or monitoring of software applications running one computing systems, and more particularly, to gathering and use of semantic-dependency information and performance monitoring results to derive a balanced software monitoring profile.

BACKGROUND

Imposing the integrity of running software requires the monitoring of all its data during execution, e.g., to ensure it is not modified by a malicious agent. Such integrity monitoring of all data imposes high performance penalties on the protected software and on the execution environment.

Existing techniques that attempt to alleviate the performance impact of integrity measurements or monitoring, either resort to sampling of the monitored data (See, e.g., J. Mai, C.-N. Chuah, A. Sridharan, T. Ye, and H. Zang, "Is Sampled Data Sufficient for Anomaly Detection?," in Proc. ACM SIGCOMM Conf. Internet Measurement, 2006, pp. 165-176, or see N. Duffield, C. Lund, and M. Thorup, "Properties and Prediction of Flow Statistics from Sampled Packet Streams," in Proc. ACM SIGCOMM Wkshp. Internet Measurement, 2002, pp. 159-171), or to the use of custom designed hardware [See, e.g., N. Petroni, T. Fraser, J. Molina, and W. A. Arbaugh, "Copilot—a coprocessor-based kernel runtime integrity monitor," in Proc. USENIX Security Symp., 2004] and instruction set architectures [See, e.g., Y. Fei, "Microarchitectural Support for Program Code Integrity Monitoring in Application-specific Instruction Set Processors," in Proc. Conf. Design, Automation & Test in Europe, 2007, pp. 1-6; M Milenkovic, A. Milenkovic, and E. Jovanon, "Hardware support for code integrity in embedded processors," in Proc. Conf. Compilers, Architecture and Synthesis for Embedded Systems, 2005, pp. 55-65; and, W. B. Noble, T. W. Bradley, and M. W. Autry, "Integrity checking procedure for high throughput data transformations", U.S. Pat. No. 5,586,204].

In the case of sampling, the performance penalty incurred by integrity monitoring is reduced by decreasing the number of trigger events received by the monitor upon data modifications, or by decreasing the number of monitored data elements. Either sampling approach results in a reduction of the performance penalty proportional to the reduction in events received by the integrity monitor. Some hardware-based techniques propose to employ co-processors that can read data from the running software without incurring any additional overhead [See, "Copilo—a coprocessor-based kernel runtime integrity monitor," referenced herein above].

Other techniques extend the instruction set and micro architectures to automatically augment processors with hardware integrity monitors [See, e.g., "Microarchitectural Support for Program Code Integrity Monitoring in Application-specific Instruction Set Processors," and "Hardware support for code integrity in embedded processors," referenced herein above].

There are drawbacks associated with these prior art techniques. The sampling technique suffers from weak security guarantees. By reducing the number of data elements monitored or the frequency with which they are monitored, the chance of catching an attack while it happens is decreased accordingly. Thus, sampling always leads to a reduction in security, often in unpredictable ways. Hardware-based techniques preserve the security of the system, but do so at high incurred costs (since new hardware needs to be added to the system) and in an application-specific way (since the hardware has to be adapted to a specific application domain).

A further problem addressed by integrity monitoring systems is the problem of protecting the integrity of running software in the presence of a malicious agent, e.g., a malicious agent running at the same privilege level. The malicious agent can modify the data over which the protected software operates, thus forcing it to compute incorrect results, to allow access to otherwise unauthorized resources, or to report to the user a state configuration different from the active one.

Existing solutions are part of one or two categories based on their approach to the problem of runtime-integrity protection: Anti-virus (AV) [See, e.g., Symantec AntiVirus, http://www.symantec.com], anti-rootkit [See, e.g., F-Secure BlackLight, http://www.f-secure. com/blacklight/], host intrusion detection systems (HIDS) [See, e.g.,Osiris, http://osiris.shmoo.com/], anomaly detection systems (ADS) [See, e.g., IBM Proventia Network Anomaly Detection System,], and information-flow tainting systems [See, e.g., Yin, H., Song, D., Egele, M., Kruegel, C., and Kirda, E. 2007. Panorama: capturing system-wide information flow for malware detection and analysis. In Proceedings of the 14th ACM Conference on Computer and Communications Security (Alexandria, Va., USA, Oct. 28-31, 2007). CCS '07; ACM, New York, NY, 116-127) DOI] attempt to identify the malicious agent before it starts executing or while it executes. If these solutions identify the malicious agent, they can shut it down and remove it from the system. These solutions fall short of the stated problem, as they run at the same privilege level as the protected software and the malicious agent. Thus, while they might be able to identify and stop the malicious agent before it affects the protected software, they are open to directed attacks from the malicious agent. Such solutions do not provide the security guarantees required by the problem of runtime-integrity protection. The second set of solutions attempt to reduce the probability of success for an attack by modifying the protected software. Such solutions include memory randomization [See, e.g., PaX Address Space Layout Randomization], data space randomization [See, e.g., Sandeep Bhatkar, R. Sekar. Data Space Randomization. DIMVA 2008: 1-22], and stack and heap protection [See e.g., Hiroaki Etoh and Kunikazu Yoda. Protecting from stack-smashing attacks,), and Microsoft. A detailed description of the Data Execution Prevention (DEP) feature in Windows XP Service Pack 2, Windows XP Tablet PC Edition 2005, and Windows Server 2003,].

By their nature, these mechanisms are probabilistic, protect only against simple attacks, and may incorrectly identify benign software as malicious (because these solutions are independent of the protected software).

Further, existing solutions that share the runtime environment with the protected software can thus be compromised by malicious software rendering them inefficient. Solutions that strengthen the protected software or its runtime environment may suffer from false positives.

Thus it would be highly desirable to address the problem of protecting the integrity of running software in computing or data processing environments, e.g., in the presence of a malicious agent running at the same privilege level that can modify the data over which the protected software operates, thus forcing it to compute incorrect results, to allow access to otherwise unauthorized resources, or to report to the user a state configuration different from the active one.

SUMMARY

In one aspect there is provided a system, method and computer program product that is configured to define automatically characteristics (called "invariants") of a software program, and to monitor these characteristics while the program is running, in order to identify attacks against the security of the running software program. Further, there is provided a system optimization to reduce the number of characteristics to monitor to thereby improve the performance of the runtime monitor without reducing the security guarantees.

According to this aspect, the system, method and computer program product operates to protect the integrity of running software, e.g., in the presence of a malicious agent running at the same privilege level. The malicious agent can modify the data over which the protected software operates, thus forcing it to compute incorrect results, to allow access to otherwise unauthorized resources, or to report to the user a state configuration different from the active one.

In one aspect, there is provided a computer-implemented method for verifying integrity of a running application program on a computing device, the method comprising: determining entry points into an application programs processing space that potentially impact data elements of the running application; mapping data elements reachable from the determined entry points into a memory space of a host system where the application program to verify is running; monitoring, during run-time, the memory space to verify any modification to a data element does not breach a program state; and initiating a response to the potential modification when the modification breaches the program state.

Further to this aspect, the monitoring comprises checking potential updates to a target data structure relevant for a proper execution of the application program.

Further to this aspect, the monitoring comprises checking potential updates to a target data structure relevant for preserving semantic integrity of the program state.

In a further embodiment, there is provided a run-time software monitoring system comprising: a memory; a processor in communication with the memory, wherein the system is configured for performing a method comprising: pre-determining data structures that affect the semantics of a program state of a program to be monitored; constructing a semantic-integrity profile based on a code of an application program, the profile comprising constraints that hold true at particular states for semantic integrity to be preserved. Performing run-time monitoring of the program to determine when the program enters the particular program state; checking the invariants and determining if one or more constraints are not satisfied indicating semantic integrity breach of the program; and, raising an alert in response to the determining.

There is further provided a method for run-time software monitoring comprising: pre-determining data structures that affect the semantics of a program state of a program to be monitored; constructing a semantic-integrity profile from the source code or compiled binary code of the core component, the profile comprising constraints that hold true at particular states for semantic integrity to be preserved; performing run-time monitoring of the program to determine when the program enters the particular program state; checking the invariants and determining if one or more constraints are not satisfied indicating semantic integrity breach of the program; and, raising an alert in response to the determining.

In one aspect, the system, method and computer program product utilizes semantic information from the data of the running software in order to explore informed tradeoffs between acceptable performance penalties and changes in security guarantees. In one embodiment, the semantic information includes entry points into the software's data space and dependencies between data elements that are backwards/forwards reachable from identified entry points.

A computer program product is for performing operations. The computer program product includes a storage medium readable by a processing circuit and storing instructions run by the processing circuit for running a method. The methods are the same as listed above.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION

Figure 1:
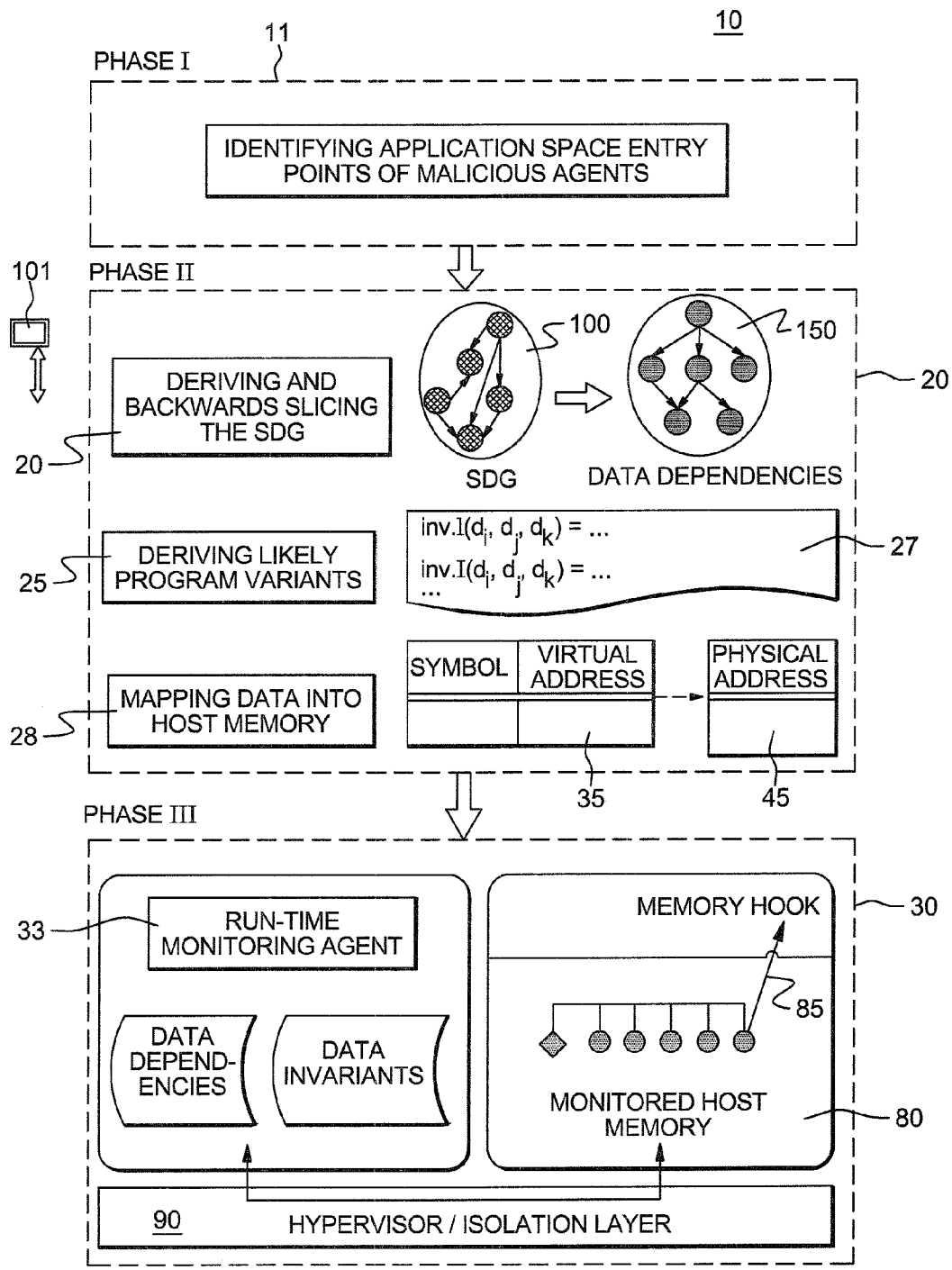
FIG. 1 depicts a conceptual overview of a system and method for monitoring software application integrity according to one embodiment.

FIG. 1 depicts an overview of a system and method for monitoring software application integrity according to one embodiment of the present invention. The method 10 is operable as a series of phases: including a first phase 11, where, in one embodiment, existing malicious agents are run in a sandboxing system, or like equivalent, and behavior traces for these agents are collected and analyzed to detect the agents' entry points in the software's application space. Then, in a second phase 20, there is built a system dependence graph (SDG) of the considered application based on a pre-determined entry point. Then, the system computes interprocedural and intraprocedural data dependencies by performing path-sensitive backwards slicing on the SDG. Then, in a further implementation of second phase 20, an invariant detector is implemented for reporting properties satisfied by a group of data elements, computed as part of the data dependence graph; and, in a further step of second phase 20, data elements computed as part of the data dependency graph are mapped into the memory space of the host where the software to verify is running. Then, in a third phase 30, FIG. 1, run-time monitoring is performed to detect a violation and responding, by the security agent, with appropriate measures.

More particularly, in first phase 11, existing malicious agents are run (operated) in some form of a sandbox, using a sandboxing technique, and the method collects behavior traces for these agents. The collected behavior traces for these agents are then analyzed to detect the agents' entry points in the application space.

It is understood that application space entry points will vary from application to application. Thus, in one embodiment, these application space entry points may be defined by a human expert, based on the description of the application and the APIs (application programming interfaces) defined by the application. For example, in the case of an operating system kernel, the application space entry points are the system calls defined by the kernel. These entry points may be determined using automated tools.

In a further aspect, an analysis performed during processing of the second phase 20 is additionally leveraged to discover new entry points. For example, in order to apply this method to an example software application, e.g., Linux kernel space, several Linux rootkits are run (operated) on top of a processor emulator, e.g., in one example, a QEMU processor emulator where binary instrumentation is used to determine rootkit entry points into the kernel space. Each determined entry point is then provided as input to Phase II. A further embodiment for discovery of entry points is described in "K-Tracer: A System for Extracting Kernel Malware Behavior". Andrea Lanzi, Monirul Sharif, and Wenke Lee. In Proceedings of The 16th Annual Network and Distributed System Security Symposium (NDSS 2009), San Diego, CA, February 2009 (incorporated by reference herein).

The second Phase 20 includes: a step 22 for building a system dependence graph (SDG) 100 of the considered application based on a pre-determined entry point. The SDG may be generated automatically by implementing a tool for analyzing the code of the application. Tools are implemented that generate the SDG from either the source code of the application or from its binary (compiled) code. In one embodiment, this tool may be performed offline, as a preprocessing step before running the program to be monitored. A commercially available program for generating the SDG is the GrammaTech CodeSurfer program, incorporated by reference herein.

More particularly, the SDG 100 is a collection of dependence graphs 150 derived over each procedure in the application. Edges in the SDG represent both data flow between the graph nodes as well as control conditions, on which execution depends. An example SDG 100' is given in FIG. 2A, starting at procedure "detach_pid" 105 which functions to remove the process descriptor "task" structure 106 from the hash tables of type "type" 107. Graph nodes, represented in FIG. 2A as nodes 101, represent program statements and interprocedural dependencies and edges 102 show data dependencies and conditional control flow in the application. The method then performs computing interprocedural and intraprocedural data dependencies by performing path-sensitive backwards slicing technique on the SDG 100. Performing path-sensitive backwards slicing on the SDG involves traversing the SDG backwards starting from the entry point(s) defined in Phase I, along all likely execution paths in the SDG, and identifying data dependencies within derived slices. This is accomplished, for instance, by traversing all SDG edges incident onto the entry point(s) in the opposite direction to the direction of the edge and collecting the program variables that are related to the entry point(s). FIG. 2A illustrates an example SDG 100', and FIG. 2B illustrates an example data dependency graph 200 derived therefrom. For example, FIG. 2B shows the result data dependency graph 200 of computing dependencies between data elements reachable, through backwards slicing, e.g., from an example entry point "link->pid" 120 defined in SDG 100' of FIG. 2A. A result of the backwards slicing over the SDG is the identification of a complete set of program variables that are to be monitored during Phase III.

Then, in a further step 25 of the second phase 20, an invariant detector component is implemented to report properties satisfied by a group of data elements, computed as part of the data dependence graph in the step 22 of second phase 20. Invariants are properties or formal specifications that hold at a certain point in a program, when a specific execution path is taken. The invariant detector observes data in a program, and reports permissible properties, i.e., properties that should hold true on data observed along a specific execution path, and non-permissible properties, i.e., properties that should hold false. Multiple forms of invariants over the application data structures may be detected such as invariants 27 depicted in FIG. 1. Invariants 27 include conjunctive invariants, disjunctive invariants, recursive invariants, conditional invariants and associated control conditions, and invariants representing relationships (e.g., unary, binary, is_pointer) between variables.

Thus, during Phase II, after the backwards slicing of the SDG, the invariant-detector component analyzes the code of the program to determine how the program variables obtained from the SDG relate to each other. For example, variables could be updated in lockstep, or they can have the same value, or some other mathematical relation that holds between them. This information is captured as logical formulas referred to as program invariants. As implemented herein, a program invariant is a logical formula describing a relation between program variables (for example, that a variable x is equal to a variable y+1). In this example, the runtime monitor continuously collects the values of x and y, inserts these values in the formula of the program invariant, and check whether the formula is true. An invariant does not hold true if the invariant formula, when evaluated over the values collected by the runtime monitor, is false.

A third step 28 of second phase 20 involves mapping data elements computed as part of the data dependency graph into the memory space of a host where the software to verify is running. Data elements, in this context, refer to program variables. As the program invariants generated in Phase II connect program variables using logical formulas written in a symbolic form (e.g., x=y+1), the runtime monitor has to be able to find these variables in the memory of the running program, in order to read their values. Mapping a program variable into memory includes finding the memory address where the program stores this particular variable. This memory address for a variable can vary from execution to execution, based on a variety of factors: There are multiple possible ways to find this memory address: the use of debugging information, the use of memory maps, or the use of memory introspection. Other pre-existing mechanisms may be employed for mapping variables in memory.

As shown in FIG. 1, in a next step, data comprising the virtual memory addresses of "interesting" data is extracted. For each named data item (also referred to as a program symbol or a program variable), its address in memory is determined. In an example application described herein for verifying the integrity of a Linux kernel application, there is extracted the virtual addresses 35 of several "interesting" data structures, such as, e.g., the system call table, init_task, etc., from the System.map file at the host configuration time. For example, in the case of the System.map file, the name of a program variable/symbol is used to look up in this file its address, e.g., expressed as a numeric value. In one embodiment, a user, e.g., a security expert, may decide which of a program's variables/symbols are interesting. This decision is made based on previous attacks which affected particular variables/symbols and based on knowledge about the application. In general any program variable/symbol that directly control the operation of the program is of interest. The derived data elements are then located as offsets from these virtual memory addresses. The method then translates the computed virtual addresses 35 into host physical addresses 45 and places memory hooks 85 at those physical addresses in the monitored system. As known, memory hooks 85 are the mechanism through which the runtime monitor observes the value of a variable as this value changes. Once the runtime monitor maps the variables used in invariants to memory addresses, it will then install the memory hooks 85 to observe the values that the program places at those memory addresses 45.

Third phase 30, FIG. 1 employs the run-time monitoring agent component to monitor memory system 80 in real-time as the application executes. In this phase, a run-time monitoring agent 33 is run to detect when a write event reaches an entry point prior determined as an entry point of a malicious agent (e.g., malware kernel module). In response, the corresponding memory hook 85 is triggered and control passes to the monitoring agent 33 functioning as a security agent component running outside the monitored memory system 80. Monitoring agent 33 subsequently requests the values of the data elements, on which memory hooks 85 have been placed. If the invariants (computed in second Phase 20) do not hold true under the set of retrieved data values, a violation is detected and the security agent 33 responds with appropriate measures, e.g., raising an alert signal.

In one embodiment, the run-time monitoring agent 33 is built using a virtual machine and a hypervisor 90. "On-write" trigger events are signaled to the hypervisor 90, which subsequently retrieves the values of the remaining memory hooks 85 (that are part of the data dependence graph) by introspection.

Figure 3:
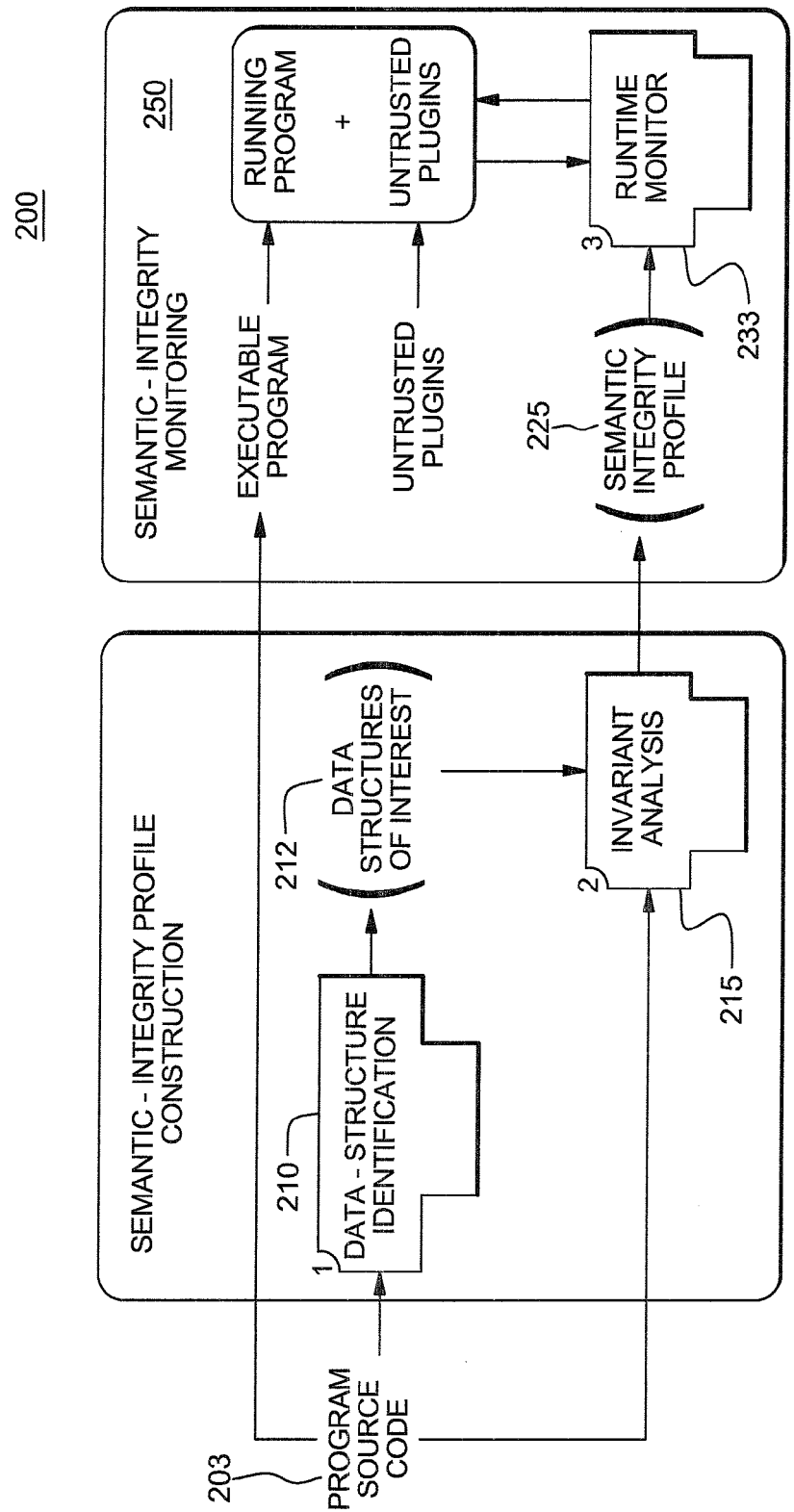
FIG. 3 illustrates a high-level diagram of the semantic-integrity monitoring methodology according to one embodiment.

FIG. 3 illustrates an alternate embodiment of a runtime semantic integrity monitoring system 200, where inputs include a source code 203 to a "main" application where a set of data structures 210 of importance to the main application are identified. As described with respect to FIG. 1, there is performed deriving data structures of interest at 212 and constructing state invariants 215 over the corresponding variables in the program, the ensemble of which constitutes a semantic-integrity profile 225. The system 200 performs deriving the invariants for a program by considering all paths that update the data structures of interest. After deriving the semantic-integrity profile 225, the program variables that appear in the profile invariants are monitored during program execution by run time monitor component 233. Run-time monitoring of execution state and checking of state invariants are performed during this phase.

In the construction of the Semantic-integrity profile 225, there is first performed identifying data structures of interest 212. In order to derive the set of variables necessary for establishing the state invariants, data structures 212 are first determined whose integrity is to be monitored. A data structure 212 used by a core component is a candidate for semantic-integrity monitoring if it influences the operation of the program and if its value persists across multiple interactions between the core component and the plugins. That is, an extensible program includes a core component that defines its primary functionality and a set of zero or more extensions or plug-ins that enhance this primary functionality. The core component starts first when the program is started and loads the extensions/plug-ins requested by the user. A key characteristic of extensible programs is that the core component and the extensions/plugins are created by different parties, so they have different trust or security guarantees. In one example, the "task_struct" list and "runqueue" in the Linux kernel fit these characteristics and are candidates for semantic-integrity monitoring. Thus, in one embodiment, these data structures 212 are identified "of interest" based on knowledge of the Linux kernel and the operation of many kernel rootkits with particular focus on kernel data structures whose contents directly reflect in user space. This basis for this is that the kernel maintains a set of logical data structures that are reflected in user space, and all other data structures are internal to the kernel and depend on the primary set. It is understood that techniques exist for automatically determining data structures critical to kernel operation. New data structures may be added to the set of monitored data structures.

In FIG. 3, the step of deriving state invariants includes, for each data structure of interest, the generating of invariants that have to hold when the data structure is modified. In other words, each time a data structure of interest is updated, the associated invariants must allow verification that the update matches the other variables which are part of the program state. This drives the implementation of the invariant-generation algorithm, described herein-above with respect to FIGS. 2A and 2B which operates by identifying the code locations where a data structure is updated. For complex data structures such as collections of objects, updates include additions of new objects to the collection, modification of existing objects in the collection, modification of the collection metadata (e.g., re-balancing a binary tree or sorting a list), and removal of existing objects from the collection. A pointer analysis may be further integrated into the algorithm. For program paths reaching an identified code location, the method includes collecting all the variables that influence the update operation and, for each, there is derived an invariant that captures them. As multiple paths can usually reach a code location where an update of interest occurs, multiple invariants are generated, one per path, for each possible update.

More particularly, as described with respect to FIGS. 2A and 2B, there is performed a static analysis of the program source code to compute a control flow graph (CFG) of the program paths that reach data-structure updates. This CFG, is inter-procedural for handling programs of arbitrary complexity, and is an intermediate representation of the program slicing procedure: for a variable "x" that represents the data structure of interest, the method includes slicing the program to include only the program variables needed to propagate dependency relationships between the entry point and an update to the variable "x". Computing the slice includes steps of: generating data flow information from each statement involved in the CFG. Data flow information captures the set of program variables at each node of the CFG. This data flow information is then used to extract a program slice. At each CFG node, the slice consists of those variables that affect, directly or indirectly, the value of target variable "x." In one implementation, loops may be ignored without a loss of imprecision due to this approximation. Most extensible software does not have a unique entry point, as it is usually designed as a reactive system, receiving various requests from plug-ins and returning responses. One slicing algorithm implemented accounts for this by considering all paths from any entry point to any update of interest. For example, in the case of the Linux kernel, there is considered the system call handlers, the interrupt handlers, and the driver-support functions as entry points.

FIGS. 2A, 2B illustrate the respective steps involved in calculating the slice of program P, with respect to some entry point E and a given data structure. Once program slicing, as described herein, is completed, state invariants over the variable set of interest are derived. As known, an invariant is a property over several variables that must hold true at a certain point in the program. In one implementation, invariants are computed over the variables using statements enclosed at each node of the CFG. Implementing Daikon's methodology by an invariant inference tool such as described in a reference to M. D. Ernst entitled "Dynamically Discovering Likely Program Invariants", PhD thesis, University of Washington Department of Computer Science and Engineering, Seattle, Wash., August 2000, incorporated by reference herein, there are generated invariants that relate function call arguments, global variables and data structures, previous-state values, and data structure fields. It is noted that often multiple invariants are derived for a single update location of a data structure of interest. The invariants derived may range from unary relationships (e.g., equal to constant, non equal), to binary relationships (e.g., is less than, is greater than, is member of collection or 2), to relationships involving more than two variables. For instance, in the case of the Linux kernel, two of the invariants derived over the "task_struct" list, which represents the list of all processes started on the system, and the scheduler queue (denoted by "runqueue"), which represents the list of processes scheduled for execution, are as follows:

$v \in \text{runqueue} \Rightarrow \exists t' \in \text{task\_struct} \cdot v = t'$ $t \notin \text{task\_struct} \Rightarrow \not\exists t' \in \text{runqueue} \cdot t = t'$ The first invariant reads "when v is added to the runqueue, v must already be present in task_struct." The second invariant reads "when t is removed from the task_struct, variable t must have already been removed from runqueue." Note that there is a free variable in each semantic-integrity invariant above (i.e., v and t, respectively). These free variables represent the value at the point of the update. When the runtime monitor checks an invariant, the free variable is replaced with the value of the update to the data structure of interest.

As the state invariant derivation step provides a set of state invariants, one for each program path that reaches a location that updates a data structure of interest, the semantic-integrity profile is constructed by attaching state-identification predicates to the state invariants. Each state invariant for a data structure of interest "x" is associated with the state-identification predicate of the form Changed(x). For instance, the two invariants listed above for the Linux kernel example are converted to the following example semantic-integrity profile:

$\langle \text{Changed(runqueue)}, v \in \text{runqueue} \Rightarrow \exists t' \in \text{task\_struct} \cdot v = t' \rangle$ $\langle \text{Changed(task\_struct)}, t \notin \text{task\_struct} \Rightarrow \not\exists t' \in \text{runqueue} \cdot t = t' \rangle$ The semantic-integrity profile 225 characterizes a program's execution, operations, and data structures. Violations of the integrity profile reveal incorrect or malicious behavior of a program or its plugins at run-time. It is noted that the semantic-integrity profile does not contain any information about the program code or the plugin code. It only lists the invariants that must hold when a change in a data structure is observed, regardless of the code that caused the change.

As shown in FIG. 3, the runtime monitor component 233 observes all changes to the memory of the monitored program, regardless of whether a plugin or the core component changed the memory.

Figure 4:
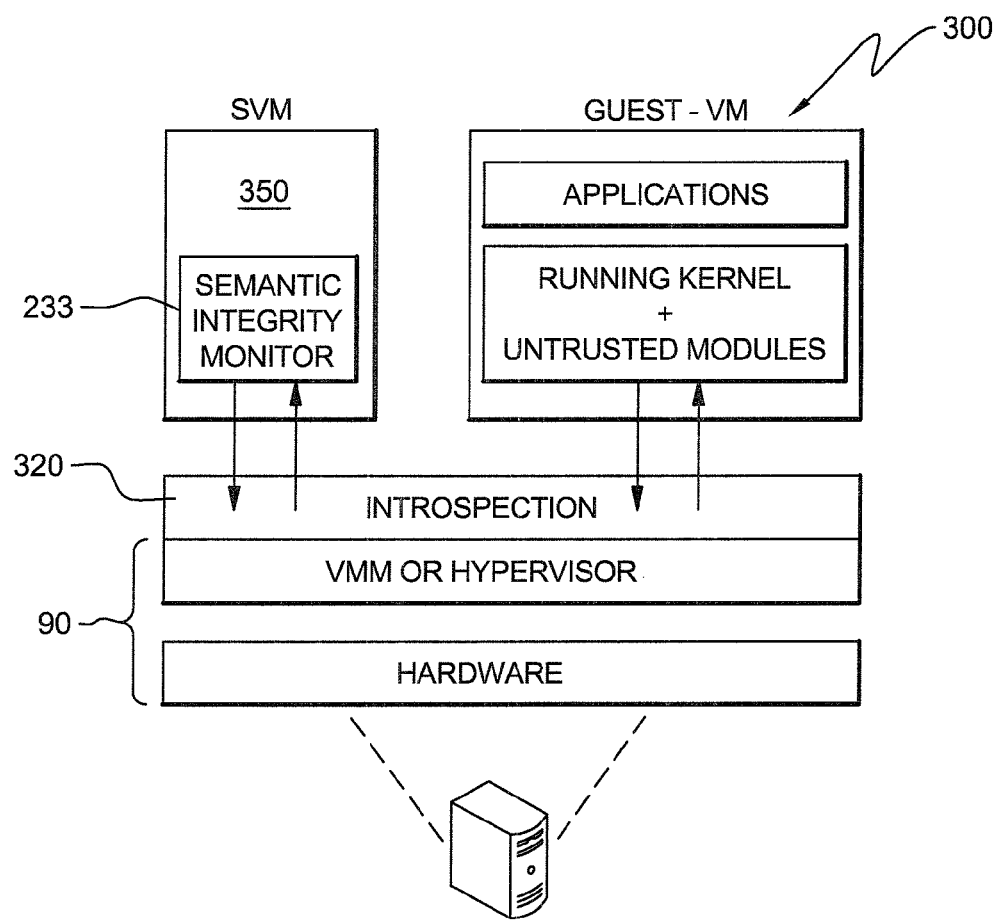
FIG. 4 shows an example semantic-integrity profile and depiction of the system for runtime monitoring of an OS kernel, in an example embodiment.

FIG. 4 illustrates a semantic-integrity profile and runtime monitoring environment for the example OS kernel program as described herein. In one embodiment, an infrastructure for this semantic-integrity monitor 233 depends on the targeted application: For example, for "mashup"—type applications, the Javascript engine or the DOM library in the web browser is one location for the runtime monitor. For user-space processes, a debug interface, e.g., coupled with support from the kernel, is sufficient. For the example implementation of the Linux kernel described herein, the monitored kernel executes in a virtual machine (VM) referred to herein as a "guest" VM 300. The runtime monitor 233 is then placed in a separate VM 350 that is referred to herein as the "security VM" (SVM). Both guest 300 VM and security VM 350 are managed by the same "VM monitor" (VMM or hypervisor) 90 and interconnect through a VMM interface. Use of the introspection functionality 320 in VMMs may then be made to allow the runtime monitor to wait for particular memory configurations in the guest VM and to validate their semantic integrity. Details concerning VM introspection functionality can be found in a reference to B. Payne, M. de Carbone, and W. Lee. Secure entitled "Flexible monitoring of virtual machines." Computer Security Applications Conference, 2007. ACSAC 2007; and, a reference to VMware Inc. entitled "Vmware vmsafe security technology;" Published online.

FIG. 4 illustrates how the execution of a malicious kernel module is detected by monitoring changes to the integrity profile. In order to observe the kernel's execution against the semantic-integrity profile, the runtime monitor 233 leverages the VM introspection interface 320 to detect any changes of the VM memory associated with the variables of interest. In the example case of the Linux kernel, locations in the memory address space of the guest VM 300 are extracted automatically from the Linux System.map symbol table, which is already present in the guest VM memory in a location reachable from known hardware registers. All of the variables present in the semantic-integrity profile are thereafter reachable from those fixed locations. For example, the "task_struct" linked list is rooted at data structure "init_tasks", whose address is available from a Linux System.map table (not shown). Additionally, it is noted that besides relying on a System.map symbol table, many Linux kernel structure are reachable indirectly from hardware registers. In one embodiment, it is assumed that the monitored system is consistent with the system that was used to establish the semantic-integrity profile and to determine root-data structures for monitoring. When the runtime monitor observes that a data structure of interest was changed in the guest VM, the monitor requests the values of all the memory locations for variables necessary in validating the observed change. These values are transmitted to the security VM 350 through the VMM's introspection interface 320. The monitor evaluates the invariant of the changed data structure using the values it received from the VMM. If multiple invariants (along various program paths) are associated with a data structure update, all are evaluated and at least one must be satisfied. If none of the checked invariants hold, the semantic integrity of the monitored kernel has breached and the runtime monitor can suspend or terminate the guest VM.

Figure 7:
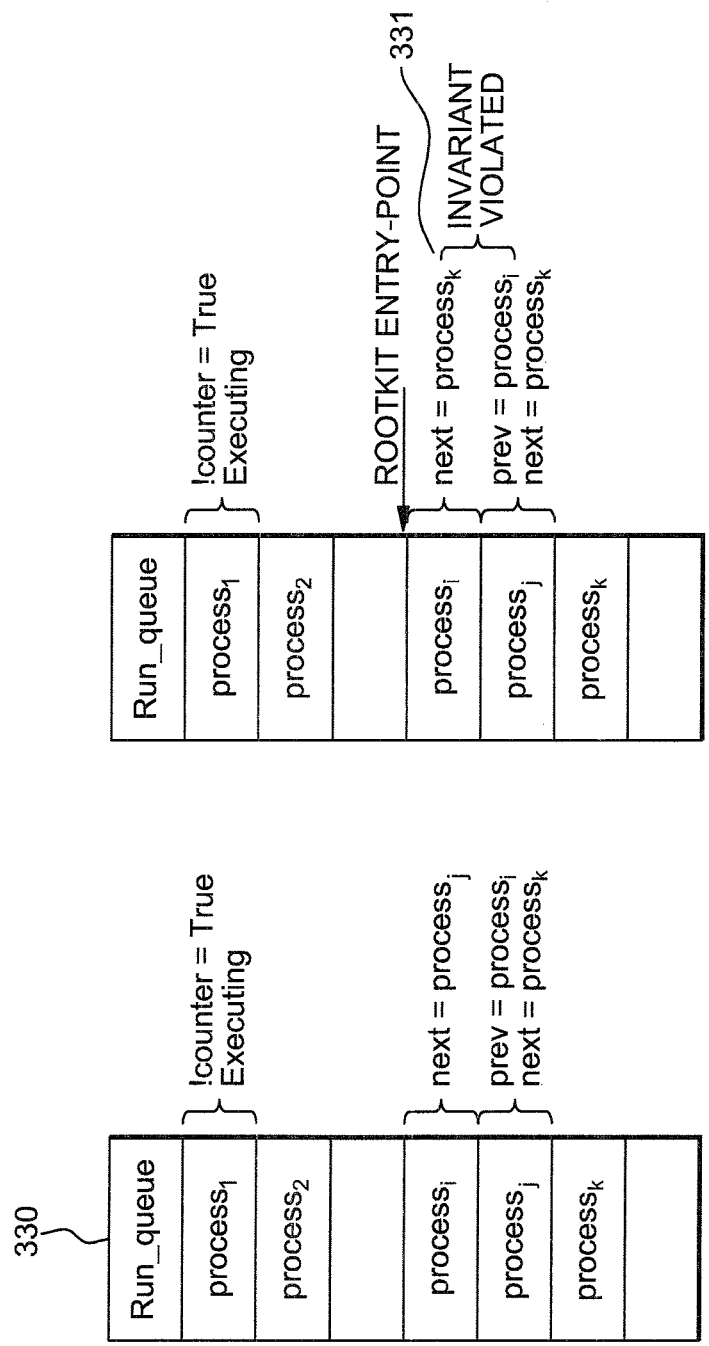
FIG. 7 depicts how a Synthetic Rootkit violates a "runqueue" invariant shown and described herein above with respect to a Linux kernel example.

FIG. 7 depicts how the runtime monitor observes that a data structure of interest was changed in a guest VM. For example, in the Linux Kernal example found herein, a Synthetic Rootkit, e.g., a Rootkit 1 violates the runqueue invariant 330 shown and described herein above with respect to the Linux kernel example, and confirms that even minimal intrusions such as omissions in updating kernel data structures 331 are detected.

In a related aspect of the invention, semantic information from the data of the running software is used to explore informed tradeoffs between acceptable performance penalties and changes in security guarantees. The semantic information includes entry points into the software's data space and dependencies between data elements that are backwards/forwards reachable from identified entry points. In one embodiment, an algorithm for deriving semantic information from the data proceeds as follows:

1. For each data element (e.g., program variable), determining the performance penalty incurred by monitoring this data element. This determination may be performed by experimental methods (i.e., run the program and monitor various data elements to determine the corresponding performance penalties).

2. For each data element, determining (using the program SDG, for example) the other data element that can depend on it.

3. Characterizing the tradeoff between performance penalty and security guarantee based on whether each data element is selected for monitoring or not. If a data element is not selected for monitoring, security is decreased because an attack could succeed by undetectably modifying this data element and any elements that depend on it. If a data element is selected for monitoring, a performance penalty is incurred.

Figure 5:
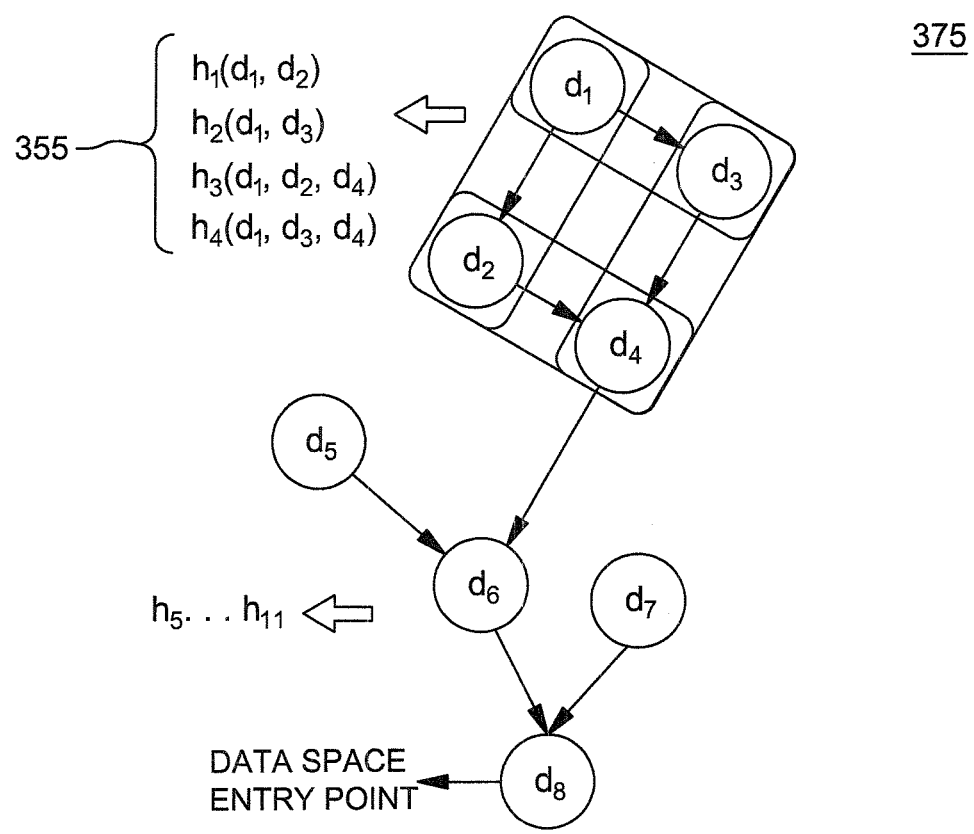
FIG. 5 depicts an example generation of data dependencies via graph G(V,E) and related set H for an example problem set-up in an example implementation; and, FIG. 6 illustrates a method for using semantic information from the data of the running software in order to explore informed tradeoffs between acceptable performance penalties and changes in security guarantees in one embodiment.

For example, as shown in FIG. 5 depicting a problem set-up, data dependencies are illustrated in graph G(V,E) 375 and set H. Vertex-set V includes the application's data elements and edge-set E represents dependence relationships among those elements. For example, setting $H=\{h_1, h_2, \ldots, h_n\}$ represent the integrity profile of the application, an example profile of H 355 is shown by example in FIG. 5. Each element $h_i$ in H, reflects a property that is to be satisfied by $(d_j, \ldots, d_k)$. The element $h_i$ corresponds to an invariant derived over $(d_j, \ldots, d_k)$, or to assert statements, or to a formal specification of the data elements, etc. Based on the problem set-up, in one alternate embodiment, the set of monitored data elements $d_i$'s in G(V,E) is reduced, and consequently the set of $h_i$'s defined over those data elements, with minimal impact on the security guarantees of the integrity monitoring system, while maintaining acceptable run-time overheads.

Figure 6:
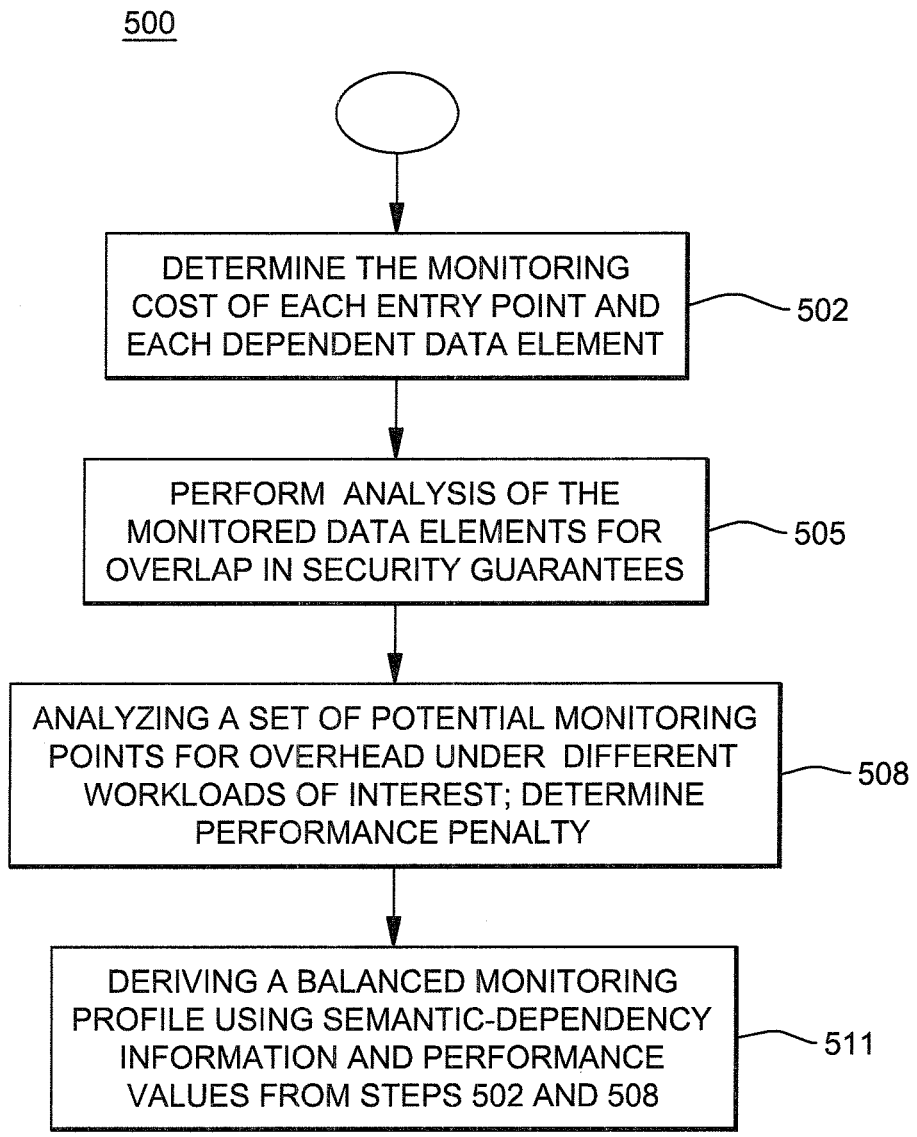

Thus, according to a further embodiment, as shown in FIG. 6, after the data dependencies and program invariants are determined, and prior to performing run-time monitoring to detect potential breach of a semantic integrity program state, a method 500 is performed that implements the following:

At 502 of method 500, there is performed determining the monitoring cost of each entry point and each dependent data element therefrom. This step establishes a baseline measurement of the performance penalty, were the system to continuously monitor all data elements while the software is running. Then, at 505, an analysis of the monitored data elements for overlap in security guarantees is performed. Given the dependencies between data elements, the technique infers the elements that, for example, are updated in lockstep, or are always synchronized, or are always constant. Data elements that do not offer overlapping security guarantees become candidate monitoring points. That is, two data elements that do not depend on each other (according to the program SDG) are independent and thus offer distinct, non-overlapping security guarantees. Each data element is a potential candidate for monitoring. For a given set of data elements, the corresponding cost of monitoring (i.e., performance penalty) is determined by running the program and monitoring exactly those data elements. A monitoring profile is a set of data elements chosen based on its (low) performance penalty, as observed experimentally, in one embodiment.

Proceeding to 508, there is next performed analyzing a set of potential monitoring points for overhead under different workloads of interest. While step 502 provides a baseline measurement of the performance penalty, in step 508, the performance penalty is considered under custom workloads for specific scenarios, e.g., a web-application server. An acceptable performance penalty depends from application to application. For example, for server software the acceptable performance penalty could be quite low (milliseconds per request), while for interactive desktop software the acceptable penalty could be much higher (up to 1-2 seconds).

Then, at 511, there is performed selecting the optimal set of monitoring points considering security guarantees and monitoring overhead. Particularly, use is made of the semantic-dependency information together with the performance numbers from steps 502 and 508 to derive a balanced monitoring profile comprising a set of data elements chosen based on its (low) performance penalty, in one embodiment.

Referring to step 502, FIG. 6 in more detail, the cost of monitoring each entry point in the application space and all respective dependent elements is determined. In operation, during run-time, the system performs retrieving the content of specific memory pages (where data elements of interest reside), each time a write event, for example, hits an entry point. The penalty incurred by continuously monitoring all data dependencies is considered as a baseline measurement of the integrity monitor performance. In case this penalty is acceptable (e.g., server software operates at milliseconds per request), no further optimizations are needed. Otherwise, step 505 is performed where monitored data elements $d_i$'s and associated hi's are analyzed for overlap in security guarantees. This step includes: implementing a theorem prover or any tool that determines the validity of logical formulas. An example of a theorem prover is the STP Constraint Solver. This theorem prover automatically reasons about data elements $d_i$'s, based on set H; and, eliminate the hi's associated with redundant data elements from set H. Thus, the semantic information is formalized from the data of the running software, given the set of properties describing dependencies between $d_i$'s. The theorem prover's built-in rules, infer data elements that offer same security guarantees, e.g., data elements updated in lockstep, correlated or synchronized data elements, data elements that are always constant, etc. Such inferred data elements are reduced to a minimal set, and are added with the remaining elements as candidate monitoring points. Then, the $h_i$'s associated with redundant data elements are eliminated from set H.

Continuing, in more detail, at 508, the performance penalty ("PerfWi") of potential monitoring point(s) is(are) measured under specific workloads that the monitored system is running. Example workloads may include, but are not limited to: web application benchmarks, database benchmarks. Additionally, a measure of "freqWi", the frequency of monitoring the value of $d_i$ under workload W, is computed. Together, PerfWi and freqWi measure the performance penalty and the update frequency for a data element during a program execution on a particular workload: with "PerfWi" being the slowdown in program execution time when monitoring the data element versus an execution without monitoring the data element; and, "freqWi" describing how many times a change in the value of data element was observed during its monitoring.

Further, at 508, there are defined variables "alpha" and "beta", such that a ratio "alpha"/"beta" is the performance, detection accuracy ratio used to specify a balanced monitoring profile specific to the monitored system domain. Values of "alpha" and "beta" are determined based on the baseline measurements performed at 502. In one embodiment, for example, alpha and beta are parameters determined by a security expert, to characterize the desired tradeoff between performance penalty and security guarantees. If the performance penalty is not of big concern, beta can take a small value (close to 0). If accuracy (i.e., security guarantees) is not of big concern, alpha can take a large value (close to 1). On the other hand, assuming that property "$h_i$" holds true only and only if data elements $d_i$'s, over which it is defined, assume authentic values, then there is set a variable Acci=1, where "Acci" denotes the detection accuracy of "$h_i$", when associated data elements are compromised. A heuristic estimate of the cost function, $C_i$, is defined according to:

$$C_i=\text{freqWi}*(\text{beta}*\text{PerfWi}-\text{alpha}*\text{Acci}).$$

where $C_i$ is associated with each potential monitored point. Then, the performance of the heuristic cost estimate is evaluated by selecting the optimal data set through applying a graph traversal technique to yield a minimum cost path to the entry point in the dependence graph.

In an example embodiment, a semantic-integrity profile was generated by implementing the analysis on top of a C Intermediate Language (CIL), i.e., a high-level representation along with a set of tools that permit easy analysis and source-to-source transformation of C programs. In one embodiment, to analyze the Linux kernel source code, CIL was enhanced with support for assembly code. The static analysis was performed across the whole kernel source code, in a path-sensitive and interprocedural fashion. In one implementation, referring to FIG. 4, the secure and guest virtual machines run unmodified copies of Linux version 2.6.24 for the x86 architecture. A hypervisor is used that supported VM introspection, such that the security VM can observe the guest VM'ss address space. In one embodiment, the hypervisor runs on two quad-core CPUs each running at 2.66 GHz, with 18 GB of RAM, for example. A 2.6 GHz CPU and 512 MB of RAM was allocated for the security VM and four 2.6 GHz CPUs and 512 MB of RAM was allocated for the guest VM. The runtime monitor runs as process inside the security VM.

In one embodiment, the system and method invention advantageously provides efficient protection of program data during execution by reducing the runtime overhead of providing protection to the intermediate data (or state) of the program from malicious modification during execution. Further, the system and method optimizes the protection of program data during execution and optimizes the monitoring of program data during execution, e.g., data processed in memory during the execution of a program, by taking into account the semantic relationship between data elements. In one aspect, the system and method provides protection of program data during execution, in software, without hardware extensions.

Figure 2:
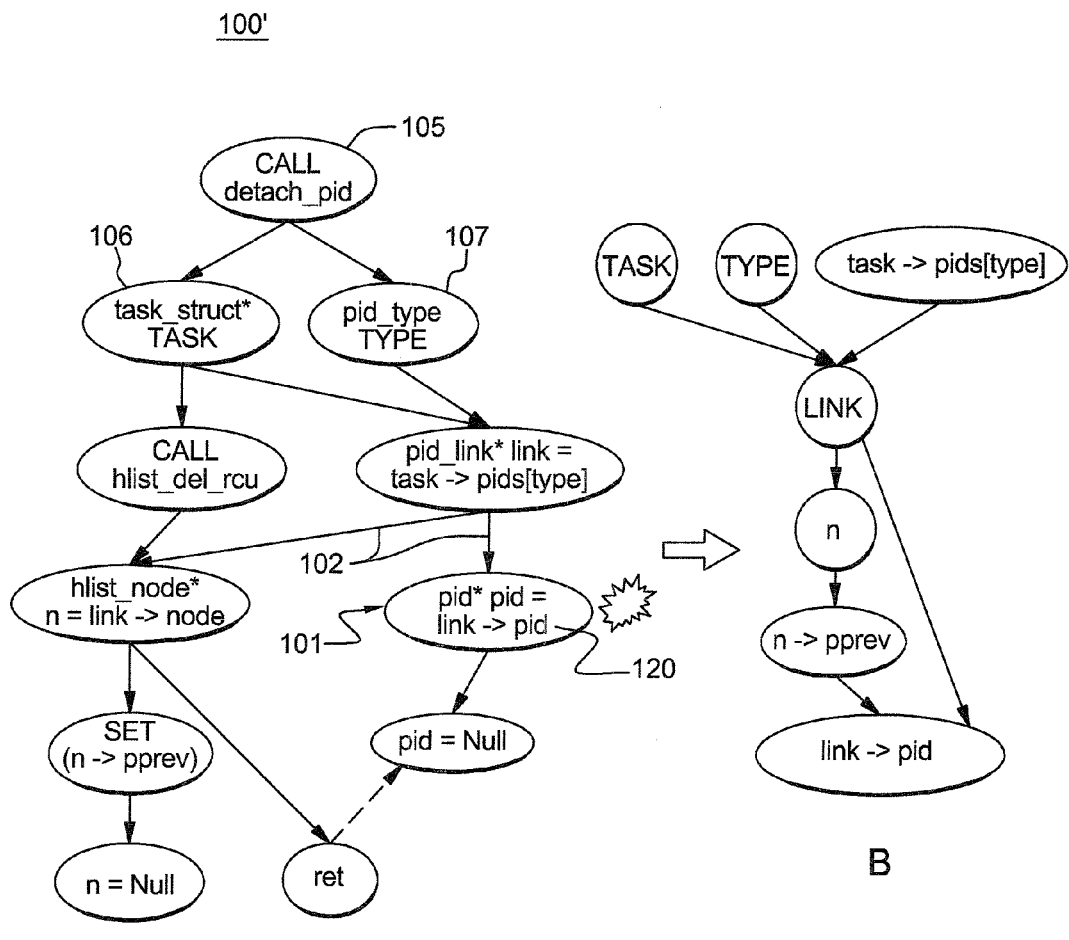
FIG. 2A illustrates an example SDG 100'.
FIG. 2B illustrates an example data dependency graph 200 derived therefrom in one embodiment.
Figures 2A, 2B:
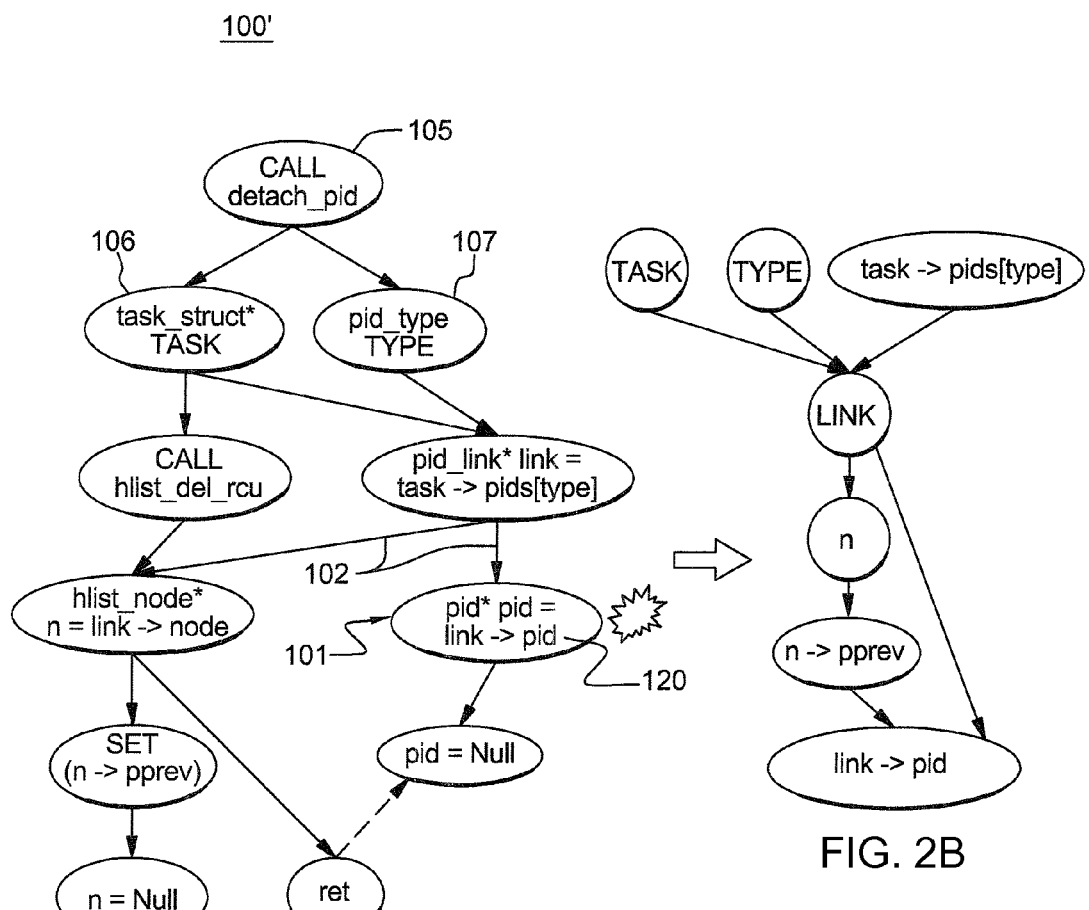
Figure 8:
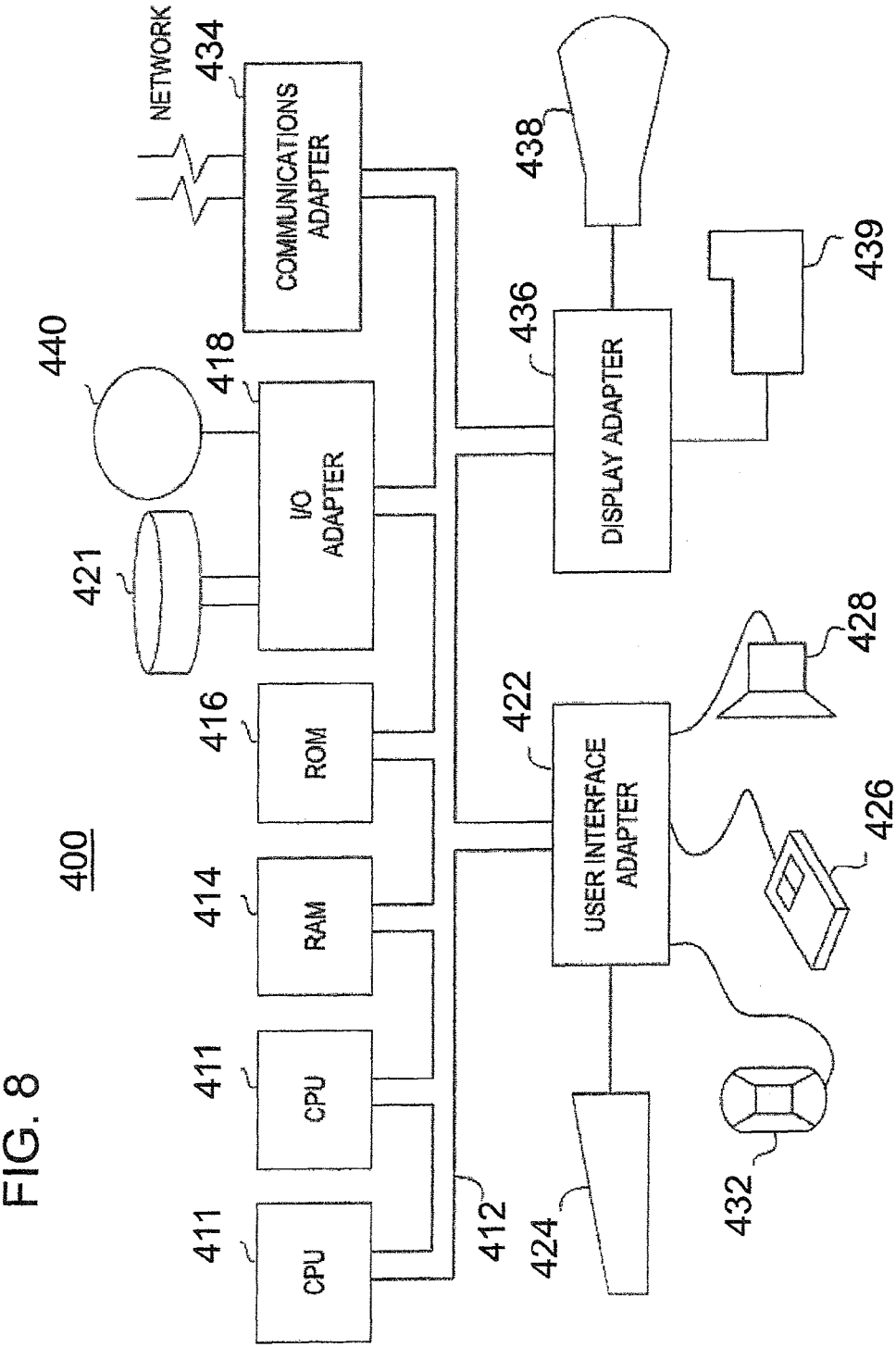
FIG. 8 illustrates an exemplary hardware configuration of a computing system 400 running and/or implementing the method steps described herein.

FIG. 8 illustrates an exemplary hardware configuration of a computing system 400 running and/or implementing the method steps in FIGS. 1-2. The hardware configuration preferably has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communication adapter 434 for connecting the system 400 to a data processing network, the Internet, an Intranet, a local area network (LAN), etc., and a display adapter 436 for connecting the bus 412 to a display device 438 and/or printer 439 (e.g., a digital printer of the like).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with a system, apparatus, or device running an instruction.

A computer readable signal medium may include a propagated data signal with computer readable program code embodied therein, for example, in baseband or as part of a carrier wave. Such a propagated signal may take any of a variety of foams, including, but not limited to, electro-magnetic, optical, or any suitable combination thereof. A computer readable signal medium may be any computer readable medium that is not a computer readable storage medium and that can communicate, propagate, or transport a program for use by or in connection with a system, apparatus, or device running an instruction. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which run via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which run on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more operable instructions for implementing the specified logical function(s). It should also be noted that, in some alternative implementations, the functions noted in the block may occur out of the order noted in the figures. For example, two blocks shown in succession may, in fact, be run substantially concurrently, or the blocks may sometimes be run in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Having thus described our invention, what we claim as new, and desire to secure by Letters Patent is:

1. A computer-implemented method for verifying integrity of a running application program on a computing device, said method comprising:
    determining entry points into an application programs processing space that potentially impact data elements of said running application;
    mapping the data elements reachable from said determined entry points into a memory space of a host system where the application program to verify is running;
    monitoring, during run-time, said memory space to verify that any modification to a data element does not breach a program state;
    analyzing the data elements for determining a presence of overlap in security guarantees, the presence of the overlap in the security guarantees indicating data dependency between the data elements;
    selecting one or more data elements having no data dependency between each other in said security guarantees;
    monitoring, for said security guarantees, the selected data elements having no data dependency between each other: and
    initiating a response to one or more of said modification to one or more of the monitored selected data elements when said one or more modification breaches said program state.

2. The computer-implemented method of claim 1, wherein said monitoring comprises checking potential updates to a target data structure relevant for a proper execution of said application program.

3. The computer-implemented method of claim 1, wherein said monitoring comprises checking potential updates to a target data structure relevant for preserving semantic integrity of said program state.

4. The computer-implemented method of claim 3, wherein said determining entry points into an application programs processing space comprises:
    performing, prior to running said application program to be monitored, a static analysis of the application program's code; and
    automatically constructing, based on said static analysis, a set of program state invariants of said application, wherein said run-time monitoring includes enforcing said invariants over contents of data structures being updated.

5. The computer-implemented method of claim 4, wherein said determining of a program's entry points to a memory space comprises:
    running said application and a module that adds additional functionality to said application in a sandbox environment; and,
    collecting behavior traces for said application program to detect said module's entry points in said host memory space.

6. The computer-implemented method of claim 5, wherein said module is an untrusted plug-in or malware module.

7. The computer-implemented method of claim 4, wherein said static analysis comprises:
    constructing a system dependence graph (SDG) from said program code of the application program based on an entry point;
    computing backward slices in the SDG, starting from said entry point, a backward slice having one or more program variables that affect, directly or indirectly, the value of a target data variable; and,
    automatically constructing said program state invariants from said backward slices.

8. The computer-implemented method of claim 1, further comprising:
    analyzing a set of potential monitoring points for overhead under different workloads of interest;
    determining a performance penalty incurred by continuously monitoring all data dependencies; and,
    deriving a balanced monitoring profile using semantic-dependency information and performance penalty values.

9. The computer-implemented method of claim 1, wherein said host machine is a virtual machine (VM) executing as guest in a host device, said run-time monitoring validating semantic integrity of memory configurations in the guest VM.

10. A computer-implemented method for run-time software monitoring comprising: pre-determining data structures that affect the semantics of a program state of a program to be monitored;

constructing a semantic-integrity profile based on a code of an application program, said profile comprising constraints that hold true at particular states for semantic integrity to be preserved;

performing run-time monitoring of said program to determine when the program enters said particular program state;

checking invariants and determining if one or more constraints are not satisfied indicating semantic integrity breach of said program;

analyzing data elements in said monitored program for determining a presence of overlap in security guarantees, said presence of said overlap in said security guarantees indicating data dependency between said data elements;

selecting one or more data elements having no data dependency between each other in said security guarantees;

monitoring, for said security guarantees, said selected data elements having no data dependency between each other; and raising an alert in response to a modification to one or more of said monitored selected data elements when said modification breaches said particular program state.

11. The method of claim 10, wherein said constructing a semantic-integrity profile comprises:

performing, prior to running said application program to be monitored, a static analysis of the application program's code; and automatically constructing, based on said static analysis, a set of program state invariants of said application, wherein said run-time monitoring includes enforcing said invariants over contents of data structures being updated.

12. The method of claim 11, wherein said static analysis comprises:

running said application and a module that adds additional functionality to said application in a sandbox environment; and, collecting behavior traces for said application program to detect said module's entry points in said host memory space.

13. The method of claim 12, wherein said module is an untrusted plug-in or malware module.

14. The method of claim 11, wherein said static analysis comprises:

constructing a system dependence graph (SDG) from said program code of the application program based on an entry point;

computing backward slices in the SDG, starting from said entry point, a backward slice having one or more program variables that affect, directly or indirectly, the value of a target data variable; and, automatically constructing said program state invariants from said backward slices.

15. A run-time software monitoring system comprising:
a memory;
a processor in communication with said memory, wherein the system is configured for performing a method comprising:
pre-determining data structures that affect the semantics of a program state of a program to be monitored;
constructing a semantic-integrity profile based on a code of an application program, said profile comprising constraints that hold true at particular states for semantic integrity to be preserved;

performing run-time monitoring of said program to determine when the program enters said particular program state;

checking invariants and determining if one or more constraints are not satisfied indicating semantic integrity breach of said program;

analyzing data elements in said monitored program for determining a presence of overlap in security guarantees, said presence of said overlap in said security guarantees indicating data dependency between said data elements;

selecting one or more data elements having no data dependency between each other in said security guarantees;

monitoring, for said security guarantees, said selected data elements having no data dependency between each other; and raising an alert in response to a modification to one or more of said monitored selected data elements when said modification breaches said particular program state.

16. The system of claim 15, wherein said run-time monitoring comprises checking potential updates to a target data structure relevant for a proper execution of said application program.

17. The system of claim 15, wherein said monitoring comprises checking potential updates to a target data structure relevant for preserving semantic integrity of said program state.

18. The system of claim 17, wherein said pre-determining data structures that affect the semantics of a program state comprises:

performing, prior to running said application program to be monitored, a static analysis of the application program's code; and automatically constructing, based on said static analysis, a set of program state invariants of said application, wherein said run-time monitoring includes enforcing said invariants over contents of data structures being updated.

19. The system of claim 18, wherein said pre-determining data structures that affect the semantics of a program state comprises:

running said application and a module that adds additional functionality to said application in a sandbox environment; and, collecting behavior traces for said application program to detect said module's entry points in said host memory space.

20. The system of claim 19, wherein said module is an untrusted plug-in or malware module.

21. The system of claim 18, wherein said static analysis comprises:

constructing a system dependence graph (SDG) from said program code of the application program based on an entry point;

computing backward slices in the SDG, starting from said entry point, a backward slice having one or more program variables that affect, directly or indirectly, the value of a target data variable; and, automatically constructing said program state invariants from said backward slices.

22. The system of claim 15, further comprising:
analyzing a set of potential monitoring points for overhead under different workloads of interest;
determining a performance penalty incurred by continuously monitoring all data dependencies; and, deriving a balanced monitoring profile using semantic-dependency information and performance penalty values.

23. A computer program product for run-time software monitoring, the computer program product comprising:
a non-transitory computer readable storage medium having computer readable program code embodied therewith, the computer readable program code comprising:
computer readable program code when being run, causing a computer to pre-determine data structures that affect the semantics of a program state of a program to be monitored;
computer readable program code when being run, causing the computer to construct a semantic-integrity profile from the source code or compiled binary code of the core component, said profile comprising constraints that hold true at particular states for semantic integrity to be preserved;
computer readable program code when being run, causing the computer to perform run-time monitoring of said program to determine when the program enters said particular program state;
computer readable program code when being run, causing the computer to check invariants and determine if one or more constraints are not satisfied indicating semantic integrity breach of said program; and,
computer readable program code when being run, causing the computer to analyze data elements in the monitored program for determining a presence of overlap in security guarantees, the overlap in the security guarantee indicating data dependency between said data elements;
computer readable program code when being run, causing the computer to select, for said monitoring, one or more data elements having no data dependency between each other in said security guarantees;
computer readable program code when being run, causing the computer to monitor, for said security guarantees, said selected data elements having no data dependency between each other; and
computer readable program code when being run, causing the computer to raise an alert in response to determining that a modification to one or more of said monitored selected data elements does not satisfy said one or more constraints.

24. The computer program product of claim 23, wherein said code for constructing a semantic-integrity profile comprises:
computer readable program code configured to perform, prior to running said application program to be monitored, a static analysis of the application program's code; and
computer readable program code configured to automatically construct, based on said static analysis, a set of program state invariants of said application, wherein said run-time monitoring includes enforcing said invariants over contents of data structures being updated.

25. The computer program product of claim 24, wherein said performing a static analysis comprises:
running said application and a module that adds additional functionality to said application in a sandbox environment; and,
collecting behavior traces for said application program to detect said module's entry points in said host memory space.

26. The computer program product of claim 25, wherein said module is an untrusted plug-in or malware module.

* * * * *